United States Patent [19]

Pollock

[11] 4,098,944
[45] Jul. 4, 1978

[54] SURFACE SPRAY COATING OF LATEX FOAMS

[75] Inventor: Richard Pollock, Grangemouth, Scotland

[73] Assignee: Borg-Warner Corporation, Chicago, Ill.

[21] Appl. No.: 661,902

[22] Filed: Feb. 23, 1976

Related U.S. Application Data

[63] Continuation of Ser. No. 534,340, Dec. 19, 1974, abandoned.

[51] Int. Cl.$^2$ .............................................. B32B 27/32
[52] U.S. Cl. ........................................ 428/284; 526/317; 260/28.5 B; 260/29.7 H; 260/29.7 T; 427/385 B; 427/412; 427/421; 428/95; 428/96; 428/246; 428/250; 428/262; 428/310
[58] Field of Search .................... 260/28.5 B, 29.7 H, 260/29.7 T; 427/385 B, 412, 421; 428/262, 264, 310, 95, 96, 246, 250, 284; 526/317

[56] References Cited

U.S. PATENT DOCUMENTS

| | | | |
|---|---|---|---|
| 3,527,654 | 9/1970 | Jones et al. | 428/264 |
| 3,620,890 | 11/1971 | Kemmler | 428/262 |
| 3,756,974 | 9/1973 | Buchheim et al. | 260/29.7 H |
| 3,787,224 | 1/1974 | Uffner | 260/28.5 B |
| 3,792,007 | 2/1974 | Gleason et al. | 260/29.7 P |
| 3,840,488 | 10/1974 | Steinwand | 260/29.7 P |
| 3,859,239 | 1/1975 | Van Gils | 260/28.5 B |
| 3,962,170 | 6/1976 | Mally | 260/29.7 H |

OTHER PUBLICATIONS

Morton—Rubber Technology (2nd ed.) (Van Nostrand)-(N.Y.) (1973), pp. 193–194, 486.

*Primary Examiner*—Melvyn I. Marquis
*Attorney, Agent, or Firm*—Richard J. Schlott

[57] ABSTRACT

Low density latex foams are improved in abrasion resistance, wear character and water resistance by spray coating the surface with a coating composition comprising a carboxylated styrene butadiene latex and from 5 to 100 parts per hundred parts latex solids of a hydrocarbon wax.

5 Claims, No Drawings

SURFACE SPRAY COATING OF LATEX FOAMS

This is a continuation of application Ser. No. 534,340, filed Dec. 19, 1974, now abandoned.

BACKGROUND OF THE INVENTION

In the carpeting industry, elastomeric latex foams are frequently used to coat the underside of carpeting to provide a resilient layer, protecting the carpeting from wear and improving the feel and comfort of the carpeting. Widely employed for these purposes are highly-loaded, low density, foamed styrene-butadiene rubber latices. These are ecomonically formulated and applied, but suffer in use from poor compression set properties and a high degree of vulnerability to surface abrasion. Thus, in use and during normal handling, such carpet backings tend to be easily abraded and torn or scuffed on the surface layers, and to wear badly where exposed to roughened or abrading surface. Additionally, these low density foam structures tend to be subject to rapid moisture penetration, exhibiting poor water resistance and a high tendency to retain water when exposed to wet conditions. Although higher density foams may be formulated to overcome some of these deficiencies, the increased density results in higher costs and in decreased resiliency for a given weight.

Highly loaded, low density foams for use in carpet backing applications which have improved strength and surface wear properties without sacrifice in cost and resiliency are clearly needed.

Summary of the Invention

It has now been found that conventional highly loaded, low density latex foams commonly employed in carpet backing applications can be upgraded in their performance characteristics by applying a thin surface coating comprising a second latex composition compounded with a wax. The resulting layered structure, after drying, exhibits the desirable properties of low density latex foam backings, together with enhanced abrasion resistance, wear character and water resistance. In effect, the surface coating of the second latex provides a "skin" for the surface of the low density foam to give abrasion resistance, and penetrates the foam sufficiently to reinforce the structure without significantly affecting the weight and resiliency of the foam.

DETAILED DESCRIPTION OF THE INVENTION

The foam carpet backing structure may be formed from any of the elastomeric latex foams normally employed for these purposes, including styrene-butadiene rubber latices, natural rubber latices and blends of styrene-butadiene elastomers with natural rubber or polyisoprene in latex form. These latices are compounded with fillers, foaming aids, stabilizers, curing agents and thickening agents to provide foamable latex compositions. The foam is then carried out in batch or continuous mixing devices, incorporating air or inert gases to provide a thick, froth-like foam for application to the carpet back.

Application of the wet foam is normally accomplished by a variety of methods including spreading on the carpet back with a roller or doctor knife to the desired thickness. The coated substrate is then exposed briefly to a heating means, either gas or electric infrared heaters being more often employed, to thereby "skin" the surface of the foam prior to complete drying. The step of forming the surface skin is intended to provide an abrasion resistant toughened surface in conventional carpet backing processes. At this point in the prior art processes the structure is dried, normally in a circulating air oven in the temperature range of from 100° to 140° C. to remove water and other volatiles, resulting in the final foam-backed carpet.

In the process of the instant invention, a coating of a carboxylated latex composition is applied to the surface of the foam backing immediately after the step of forming the "skin", and prior to the conventional drying step. The structure is then dried in the normal manner, resulting in a foam-backed carpet structure having a wear-and-abrasion-resistant surface coated thereon.

The latex employed in the composition is a carboxylated styrene-butadiene elastomeric latex having a styrene content of about 50% by weight based on total elastomer. The carboxylated monomer included in the polymeric elastomer may be any of the copolymerizable caboxylic monomers such as the acrylic acids, itaconic acid, citraconic acid and the like, in amounts from 2 to 20% of the total monomer composition. Curable carboxylated latices are widely known in the latex industry and widely sold for use as paints, elastomeric goods production and the like. For purposes of the instant invention, the carboxylated latex is further compounded with a wax and a wetting agent.

The wax component of the coating composition may be a paraffin or microcrystalline wax or any of the natural or synthetic waxes, and is present in an amount of from 5 to 100 parts by weight wax per hundred parts by weight latex solids. The presence of the wax serves to impart water resistance to the final structure, by reducing the permeation of water into the foam. Additional compounds such as surfactants may also be desirable to improve the wetting of the foam surface by the coating latex and to increase penetration of the coating latex formulation into the mid-foam structure.

The carboxylated latex formulation is applied to the surface of the wet, skinned foam at a rate of from 20 to 90 grams per square meter of surface on a dry solids basis. Conventional spray equipment will preferably be employed, and the useful solids content of the composition will accordingly lie in the range 5 to 20% by weight to afford proper viscosities for use in spray equipment. Application weights lower than 20 g/sq. m. are insufficient to provide adequate protection, while application rates greater than about 100 g/sq. m. produce foams having surfaces which tend to crack on bending. Additionally, higher application weights significantly increase the final drying times and therefore materially decrease production. The preferred application weight will lie in the range 20 to 90 g/sq. m. on a dry solids basis, with the particular choice being governed in part by the character of the foamed latex employed and by economic considerations.

The invention will be better described and understood by reference to the specific embodiments given by way of illustration herein below.

Carpet Coating

A low density filled styrene-butadiene (SBR) latex foam was prepared using the following formulation, wherein all parts are by weight, dry solids basis.

| | |
|---|---|
| SBR Latex | 100 parts |

*-continued*

| | |
|---|---|
| Sulfosuccinamate (foaming aid) | 3.0 parts |
| Amine Oxide (foam stabilizer) | 1.0 parts |
| Sodium Lauryl Sulfate | 3.0 parts |
| Sulphur | 2.5 parts |
| Zinc Oxide | 3.0 parts |
| Zinc Dithiocarbamate | 1.5 parts |
| Zinc Mercaptobenzothiazole | 1.0 parts |
| Stabilizers | 1.0 parts |
| Calcium Carbonate | 250 parts |
| Water | 35 parts |
| Polyacrylate thickener - (To produce required viscosity). | |

The SBR latex employed was a non-carboxylated latex having 28% bound styrene; solids content 61%. The polyacrylate thickener was added to produce a final viscosity of 3500 cps, Brookfield, RVT 4 spindle, 50 rpm. The stabilizers are tris nonylphenyl phosphite, oleic acid, triethanol amine and alkylated bisphenol. The final solids content of the composition was 77% by weight. The latex composition was foamed in a batch mixer and aireated to a final foam density of 0.165 g/cc (dry), and applied by spreading on 7 oz./sq. yard hessian squares with a doctor blade at a thickness of 4 mm. The foam-backed squares were then exposed to an infrared heat lamp to set and "skin" the surface of the wet foam.

Surface Coating the Foam

A carboxylated SBR latex coating preparation was formulated as follows, wherein all parts are by weight on a dry solids basis.

| | |
|---|---|
| Carboxylated SBR Latex | 100 parts |
| Wax | 5 parts |
| Sodium Lauryl Sulfate | 1.0 parts |
| Water | 834 parts |

The latex was carboxylated styrene-butadiene latex with a bound styrene content of 50%, having an average particle size of 1700 A° and a total solids content of 50%. The wax was a dispersed paraffin wax having a solids content of 40%. The total solids content of the composition was 10%.

The latex coating composition was applied to the surface of the wet, skinned latex foam prepared above by spraying, using a conventional paint spray gun having a fan-type nozzle. The spray was applied as a fine mist at a dry solids applications rate of 60 g/sq. meter, taking care not to ripple the surface of the wet foam.

The sample squares were then dried in a circulating air oven at 130° C. for 12 minutes. Control samples were prepared in an identical fashion but omitting the step of spray coating the skinned foam.

The coated and uncoated foam samples were tested for wear, abrasion resistance, tensile properties and water absorption rate.

Performance Data

WIRA Dynamic Load Test (British Standards No. 4098/67)

The foam samples are placed on the flat bed of the test device, and impacted 50, 100, 200, 500 and 1,000 times. The thickness is then measured. After 1,000 impacts, the thickness of the coated foam sample had been reduced by 13%, while the uncoated control foam sample lost 26% of the original thickness. Thickness loss of foam backing under this Dynamic Test condition is regarded as a measure of carpet wear in heavy traffic areas.

Static Load Test (British Standards No. 4939/73)

The foam samples are placed on the flat bed at the test device and compressed under a load of 100 psi for 24 hours. The thickness loss, termed compression set, is then measured. The recovery rate, termed recovery regain, is then determined by thickness measurements over a 24 hour period. The coated foam sample was compression set to 83.5% of the original thickness, and recovered to 95% of the original thickness in 24 hours. The uncoated control foam sample was compression set to 82.5% of the original thickness, recovering only to 90% of the original thickness in 24 hours. This static load test is regarded as a measure of the carpet foam's ability to withstand long term heavy loading.

Abrasion Test

A 3 inch × 6 inch foam sample was placed in a Research Equipment London Abrasion Tester and abraded under a 300 gram load. The coated foam surface showed no rupture until 100 test strokes of the hessian-covered abrader foot. The uncoated control foam sample surface was completely disintegrated in the test area after 20 test strokes. The abrasion test is regarded as a test of the foam surface to withstand abrasion in handling and use.

Tensile Test

A sample of the foam 1½ inch wide × ⅛ inch thick × 6 inch long was dissected from the hessian, placed in a Hounsfield Tensometer and tested at a cross head speed of 1.5 cm/min according to ASTM D412-62T. The coated sample had a tensile strength of 1.65 lbs. and 142% elongation-at-break. The uncoated control foam sample had a tensile strength of 1.42 lbs. and 165% elongation-at-break.

Water Absorption Test

Droplets of water were applied to the surface of the foam and timed with a stop clock until completely absorbed into the foam. Twenty droplets were timed for each foam sample. The coated foam sample required an average of 35 minutes for droplet absorption while the uncoated control sample required an average of 2 seconds for droplet absorption.

It will be apparent from the foregoing testing that the performance of loaded low density foam is markedly improved by surface coating with a carboxylated latex and wax composition. Dynamic load properties, compression set and tensile properites are improved by the coating, indicating that an actual strengthening and toughening of the foam structure takes place. The abrasion test clearly demonstrates the beneficial aspects of applying the surface coating with regard to improving the ability of the foam structure to stand up to moderate abuse during normal handling. The water absorption test data provide a demonstration of the large improvement in ability to withstand exposure to water during use.

It will be understood that the particular methods employed for preparing and applying the foam latex to the hessian and skinning and drying the uncoated and coated foam samples were laboratory methods adapted to simulate actual prior art production processes, and that both continuous and batch processes are well-known for the production of foam-backed carpet structures. The spray application of the coating latex composition of the instant invention may be accomplished by means of a variety of automatic and manual spray equipment which may be readily adapted for use with existing production systems for making foam-backed carpet structures. It will also be apparent that the coating latex may be applied to one or both surfaces of foam underlayment during the production thereof.

The instant invention has been set forth and described by means of a particular coating latex composition applied to a particular foam latex structure. However, the examples are provided by way of illustration and not by way of limitation, and various modifications thereto will be apparent to those skilled in the art. The invention is therefore defined solely by the appended claims which should be construed as broadly as is consistant with the prior art.

I claim:

1. In a latex foam-backed fabric structure comprising a fabric having coated on the undersurface thereof an elastomeric latex foam, the improvement wherein the surface of the foam is spray coated with from 20 to 90 g/sq. meter of a coating latex composition comprising a carboxylated styrene-butadiene latex and from 5 to 100 parts by weight based on 100 parts of latex solids of a hydrocarbon wax.

2. The latex foam-backed fabric structure of claim 1 wherein said carboxylated styrene-butadiene latex consists of about 50% by weight styrene, from 2 to 20% by weight copolymerizable carboxylic monomer and correspondingly from 48 to 30% by weight butadiene.

3. The latex foam-backed fabric structure of claim 1 wherein said carboxylated styrene-butadiene latex consists of about 50% by weight styrene, from 2 to 20% by weight of a copolymerizable carboxylic monomer selected from the group consisting of itaconic acid, citraconic acid and acrylic acid, and correspondingly from 48 to 30% by weight butadiene.

4. A method for providing a latex foam structure having an abrasion and water resistant surface comprising the steps of (1) providing a wet latex foam structure having a skinned surface, (2) spray coating said skinned surface with from 20 to 90 g/sq meter of a coating latex composition comprising a carboxylated styrene-butadiene latex and from 5 to 100 parts by weight, based on 100 parts of latex solids, of a hydrocarbon wax, and (3) air drying the resulting coated latex foam structure at an elevated temperature.

5. The method of claim 3, wherein said carboxylated styrene-butadiene latex consists of about 50% by weight styrene, from 2 to 20% by weight of a copolymerizable carboxylic monomer selected from the group consisting of itaconic acid, citraconic acid and acrylic acid, and correspondingly from 48 to 30% by weight butadiene.

* * * * *